United States Patent
Hornstein et al.

(10) Patent No.: US 12,337,653 B2
(45) Date of Patent: Jun. 24, 2025

(54) VEHICLE-BASED AIR QUALITY AND NOISE LEVEL SAMPLING FOR USE WITH OFFBOARD MAPPING SOFTWARE

(71) Applicant: GM GLOBAL TECHNOLOGY OPERATIONS LLC, Detroit, MI (US)

(72) Inventors: Sharon Hornstein, Pardes Hanna (IL); Klaus Trangbaek, Ein Vered (IL)

(73) Assignee: GM Global Technology Operations LLC, Detroit, MI (US)

( * ) Notice: Subject to any disclaimer, the term of this patent is extended or adjusted under 35 U.S.C. 154(b) by 816 days.

(21) Appl. No.: 17/590,256

(22) Filed: Feb. 1, 2022

(65) Prior Publication Data

US 2023/0241942 A1 Aug. 3, 2023

(51) Int. Cl.
*B60H 1/00* (2006.01)
(52) U.S. Cl.
CPC ......... *B60H 1/008* (2013.01); *B60H 1/00742* (2013.01); *B60H 1/00771* (2013.01)
(58) Field of Classification Search
CPC ............... B60H 1/008; B60H 1/00742; B60H 1/00771; G01C 21/3691; G01D 7/00; G01D 21/02
See application file for complete search history.

(56) References Cited

U.S. PATENT DOCUMENTS

| | | | |
|---|---|---|---|
| 10,890,350 B2 | 1/2021 | Martin | |
| 10,909,847 B1 | 2/2021 | Libin | |
| 2003/0141965 A1* | 7/2003 | Gunderson | B60Q 9/008 |
| | | | 348/148 |
| 2012/0297028 A1* | 11/2012 | Das | G01D 21/02 |
| | | | 709/217 |
| 2016/0290979 A1* | 10/2016 | Cogill | G01N 33/004 |
| 2018/0057013 A1* | 3/2018 | Mullett | B60H 1/267 |
| 2019/0082149 A1* | 3/2019 | Correnti | G08B 13/19613 |
| 2020/0149907 A1* | 5/2020 | Iwaasa | G07C 5/008 |
| 2020/0215915 A1* | 7/2020 | Faraji | B01D 46/0086 |
| 2021/0165931 A1* | 6/2021 | Fuerst | G06F 30/20 |
| 2022/0036770 A1* | 2/2022 | Yildiz | G09F 21/04 |

FOREIGN PATENT DOCUMENTS

WO    WO-2020202203 A1 * 10/2020 ....... B32B 17/10036

* cited by examiner

*Primary Examiner* — Amine Benlagsir
(74) *Attorney, Agent, or Firm* — Quinn IP Law (57) ABSTRACT

A host vehicle for use with a remote processing station (RPS) configured to generate a pollution report from a global set of pollution data includes a vehicle body, a vehicle telematics unit (VTU), a sensor suite, and an electronic control unit (ECU). The sensor suite includes acoustic and/or an air quality sensors respectively configured for collecting pollution data samples. The pollution data samples include ambient noise and/or air quality levels as part of the global set of pollution data. The ECU selectively transmits the pollution data sample(s) to the RPS in response to predetermined conditions, via the, receives the pollution report descriptive of noise and/or air quality levels at a current location or destination of the host vehicle, and executes a control action of the host vehicle or another receiving device in response to the pollution report.

20 Claims, 3 Drawing Sheets

VEHICLE-BASED AIR QUALITY AND NOISE LEVEL SAMPLING FOR USE WITH OFFBOARD MAPPING SOFTWARE

INTRODUCTION

Particulate matter is commonly produced as a by-product of fuel combustion, power generation, manufacturing, and other processes. Although not generally categorized as air pollution per se, particulate matter also exists in the form of naturally-occurring airborne irritants such as pollen, mold, or ragweed. Particulate matter is present in the air we breathe in concentrations and size distributions which vary, often widely, based on location, time of day, week, month, or year, ambient temperature, prevailing winds, humidity levels, and other factors. Manufactured pollutants tend to be discharged at higher levels in industrial areas or around power plants, from chimneys and forest fires, and around airports. Emissions from the tailpipes of motor vehicles, train stacks, aircraft propulsion systems, and inboard and outboard motors of boats and other marine vessels also increase particulate concentrations. Pernicious health effects of a given concentration, size, and type of particulate matter on an individual user may vary, as may the user's personal desire or lack thereof to live, work, or travel in more heavily polluted areas.

Poor air quality leads to a myriad of adverse health effects, including respiratory distress and cardiovascular disease. Additionally, hearing loss and physical stress responses may result from exposure to elevated levels of ambient noise, with such noise often referred to as noise pollution. In order to avoid air and noise pollution, individuals with preexisting health conditions or pollution sensitivities tend to rely on local air quality reports when evaluating their individual exposure risk in a given location. Such air quality reports are often based on discrete measurements collected by fixed or airborne monitoring stations, and attempt to quantify pollution or allergen levels at a given location, e.g., in or above a city, county, or other relatively large geographic area. As a result, air quality and noise level data may not be readily accessible by and relevant to a given individual.

In a similar vein, ambient noise levels tend to vary greatly based on location and time of day, week, month, and year. Urban areas having a high concentration of vehicle traffic and industrial activity tend to be loud relative to rural areas. At night or on weekends, a given urban area may be considerably quieter than the same urban area during weekday working hours. Likewise, noise levels tend to increase as one comes into close proximity of active construction zones, open air concert venues or athletic stadiums, airports, railways, race tracks, and the like. Elevated noise levels may range from mere nuisance levels up to levels causing temporary or long-term physical and mental health issues. Noise pollution thus rivals air pollution in the potential adverse effects on health and overall quality of life. The present teachings facilitate individual decision making regarding potential travel to or time spent at a destination, with such decisions informed by anticipated noise and air pollution levels at or on a route to the destination.

SUMMARY

Disclosed herein are a vehicle network and related cloud-based computing methodologies for collecting air quality, ambient noise level data, por both, and for reporting the same to consumers or end users of the collected data. The present teachings are intended to disseminate more granular or location-specific data to individual users, thus better informing personal decision making of the users based on ambient air quality and/or noise levels at the user's present location or an intended destination. Due to scarcity of relevant air and noise pollution information, particularly within close proximity of the user's current location or intended destination, an individual may be unable to avoid exposure to polluted or noisy areas. The present teachings address this issue by harnessing the collective sensory and communications power of a distributed population of host vehicles. The host vehicles act in conjunction with one or more cloud-based computing resources referred to herein as a remote processing station (RPS) to provide and receive up-to-date air quality and noise level data, with the collection and dissemination of the relevant data remaining unobtrusive to individual operators of the host vehicles.

In particular, each respective host vehicle within the contemplated vehicle network is individually equipped with a sensor suite, including one or more air quality sensors and/or one or more acoustic sensors. The vehicle-hosted sensor suite is periodically and temporarily activated, typically when the host vehicle is parked, stationary, or otherwise in an off state, or in response to other predetermined conditions as set forth below. Environmental data collected by the various sensor suites of a plurality of host vehicles within a given geographical region is offloaded to the cloud and analyzed by the above-noted RPS, which in turn is in remote communication with each of the host vehicles.

In response to receipt by the RPS of the collected environmental data, referred to herein as pollution data samples to account for the presence of either or both air and noise pollution types, the RPS generates and transmits region or location-specific mapping data indicative of the pollution levels to a receiving device. The receiving device(s) in different contemplated embodiments may include the individual host vehicles, smart phones, desktop, laptop, or tablet computers, wearable devices, and the like. Ultimately, air quality and noise level maps are displayed on a display screen of the receiving device, with other beneficial options being possible as detailed below.

In particular, an aspect of the disclosure includes a host vehicle for use with a remote processing station (RPS), with the RPS being configured to generate a pollution report from a global set of pollution data. The host vehicle, which may be variously embodied as a motor vehicle, a rail vehicle/train, a watercraft or boat, a drone or airplane, and/or another mobile system, includes a vehicle body, a vehicle telematics unit (VTU) in wireless communication with the RPS and connected to the vehicle body, a sensor suite, and an electronic control unit (ECU). The sensor suite includes an acoustic sensor and/or an air quality sensor respectively configured for collecting a pollution data sample at a current location of the host vehicle. The pollution data sample includes an ambient noise level and/or an ambient air quality level. The global set of pollution data includes the pollution data sample and additional pollution data samples from one or more additional host vehicles. The ECU, which is in communication with the VTU and the sensor suite, selectively transmits the pollution data sample to the RPS in response to a predetermined set of conditions, via operation of the VTU.

The sensor suite may include the acoustic sensor and the air quality sensor in a possible implementation, with the ECU receiving the pollution report from the RPS. The pollution report in this exemplary embodiment is descriptive of a noise level and an air pollution level at the current location or a destination of the host vehicle.

The predetermined set of conditions may include the motor vehicle being parked, stationary, or in an off state.

The host vehicle may include a display screen. The pollution report may include mapping data indicative of the ambient noise level and the ambient air quality level, with the ECU configured for transmitting the pollution report to the display screen for presentation of the mapping data thereon.

The vehicle body defines a vehicle interior. The acoustic sensor in a possible embodiment includes at least one microphone positioned within the vehicle interior. External microphones may be used in other embodiments, either with or without using such in-vehicle microphone(s).

An exemplary configuration of the air quality sensor includes a particle counter and/or a gas sensor.

The ECU may be optionally configured to limit activation of the sensor suite, e.g., to less than five minutes per hour. In this or other implementations, the ECU may be configured to prompt an operator of the host vehicle with an alternative travel route option based on the pollution report.

Also described herein is a method for use with a host vehicle in communication with the above-noted RPS. An exemplary embodiment of the method includes, in response to a predetermined set of conditions, using the sensor suite of the host vehicle to collect a pollution data sample at a current location of the host vehicle, via the ECU. The method also includes transmitting the pollution data sample to the RPS via the VTU of the host vehicle, which in turn is in communication with the ECU. The pollution data sample is a constituent part of the global set of pollution data. Additionally, the method in this embodiment includes receiving the pollution report from the RPS, with the pollution report being based on prior data samples from a plurality of host vehicles. In response to the pollution report, the method further includes displaying the ambient noise level and/or the ambient air quality level on a display screen.

Yet another aspect of the disclosure includes a computer-readable storage medium on which is recorded instructions executable by a processor of the RPS. Instruction execution causes the processor to receive a global set of pollution data from a plurality of host vehicles in communication with the RPS, each respective host vehicle having a corresponding sensor suite operable for collecting a pollution data sample at a current location of the respective host vehicle. The sensor suite includes an acoustic sensor and/or an air quality sensor respectively configured to measure an ambient noise level and an ambient air quality level. The pollution data sample is a constituent part of the global set of pollution data.

Execution of the instructions also causes the processor to calculate an uncertainty level in the global set of pollution data for the current location via the processor, and to generate, via the processor using the global set of pollution data, at least one color-coded map that is indicative of the ambient noise level and an ambient air quality level at the current location and/or a destination of the host vehicle. The at least one color-coded map is based in part on the uncertainty level. A pollution report is ultimately transmitted to a receiving device for display thereon, the pollution report including the at least one color-coded map.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure and together with the description, serve to explain the principles of the disclosure.

The appended drawings are not necessarily to scale, and may present a somewhat simplified representation of various features of the present disclosure as disclosed herein, including, for example, specific dimensions, orientations, locations, and shapes. Details associated with such features will be determined in part by the particular intended application and use environment.

DETAILED DESCRIPTION

The present disclosure may be embodied in many different forms. Representative examples are shown in the various drawings and described herein in detail as non-limiting representations of the disclosed principles. To that end, elements and limitations described in the Abstract, Introduction, Summary, and Detailed Description sections, but not explicitly set forth in the appended claims, should not be incorporated into the claims, singly or collectively, by implication, inference, or otherwise. Moreover, unless specifically disclaimed, use of the singular includes the plural and vice versa, the terms "and" and "or" shall be both conjunctive and disjunctive, "any" and "all" shall both mean "any and all", and the words "including", "containing", "comprising", "having", and the like shall mean "including without limitation".

Words of approximation such as "about", "almost", "substantially", "generally", "approximately", etc., may be used herein in the sense of "at, near, or nearly at", or "within 0-5% of", or "within acceptable manufacturing tolerances", or logical combinations thereof. Also as used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

Figure 1:
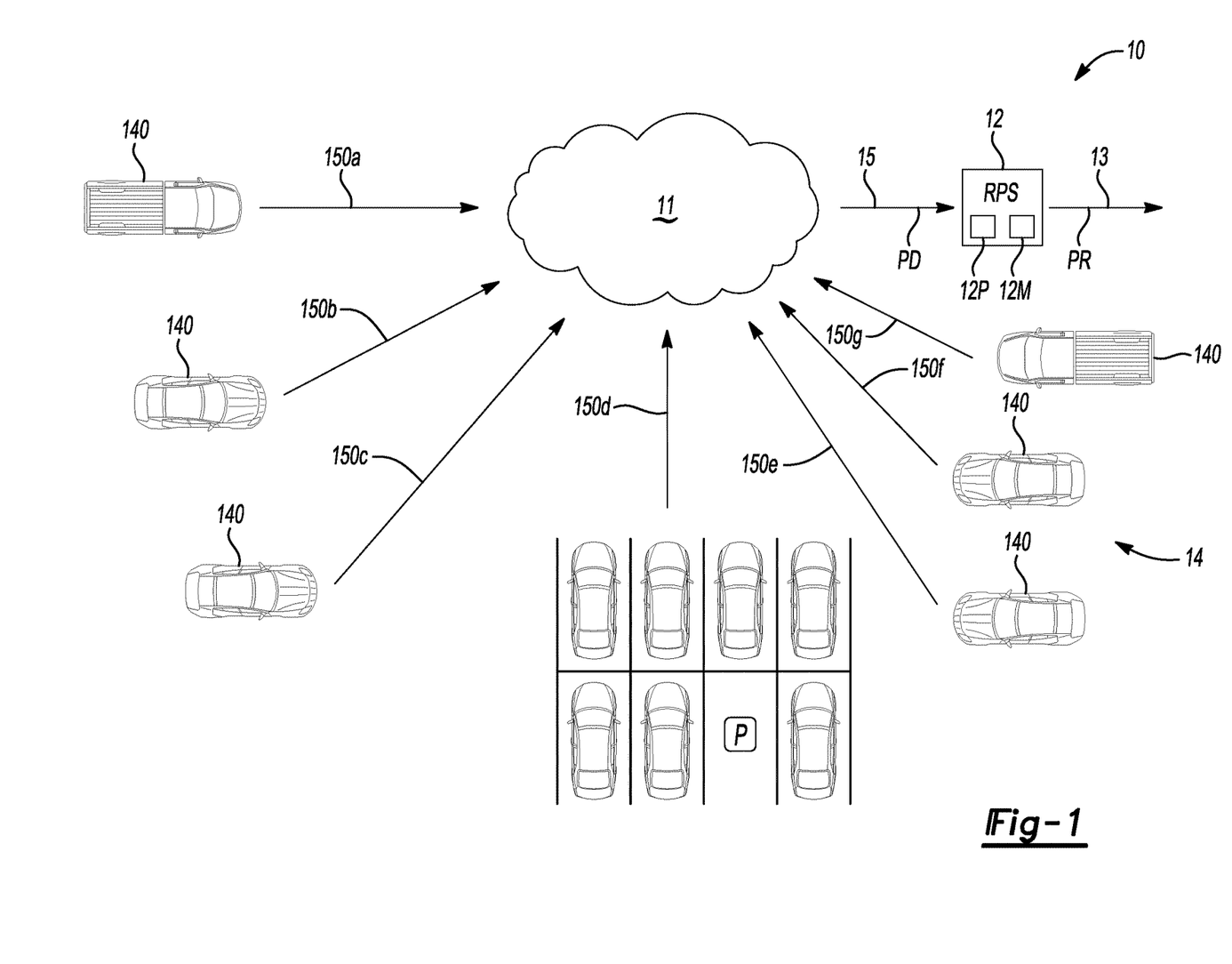
FIG. 1 is a schematic illustration of a representative vehicle network, each respective host vehicle of which is equipped with a corresponding sensor suite operated in accordance with the present application.

Referring now to the drawings, wherein like reference numbers refer to like features throughout the several views, FIG. 1 illustrates a vehicle network 10 having a remote processing station (RPS) 12 that is in wireless cellular and/or satellite-based communication with a plurality of host vehicles 14, and operable for measuring and quantifying air quality and noise levels. Within the scope of the present disclosure, the term "host" is used in the context of the vehicles 14 each serving as a respective local platform to which is attached the described sensors and other hardware systems set forth herein. For simplicity and clarity, air quality levels and ambient noise levels are sometimes referred to herein collectively as "pollution", in the colloquial context of air pollution and noise pollution. The RPS 12 is embodied as a collection of cloud-based servers or other networked computer devices, and is configured to generate a pollution report 13 (arrow PR) from a global set of pollution data 15 (arrow PD). The global set of pollution data 15 is communicated or offloaded to the RPS 12 by individual host vehicles 140 of the plurality of host vehicles 14. Each respective host vehicle 140 in turn locally collects a pollution data sample, referred to herein as 150 for clarity but individually labeled as 150a, 150b, 150c, 150d, 150e, 150f, and 150g in the simplified example shown in FIG. 1, for a total plurality (n) of such pollution data samples 150. The plurality (n) may be on the order of thousands, hundreds of thousands, or millions of host vehicles 140 depending on the covered geographical area. Each pollution data sample 150 forms a constituent part or data set portion of the global set of pollution data 15 provided to the RPS 12 via the cloud 11. Various offboard functions of the RPS 12, equipped with a processor 12P and resident memory 12M, are specified in further detail below with particular reference to FIGS. 3 and 4.

Each respective pollution data sample 150 from a given host vehicle 140 includes a local ambient air quality level and an ambient noise level, both of which are collected at a current location of the respective host vehicle 140. Each host vehicle 140 is ideally parked, stationary, or otherwise in an ignition-off state at the time of data collection and dissemination. That is, a given host vehicle 140 in the non-limiting exemplary form of a motor vehicle when in motion would tend to detect powertrain, wind, and road noise, as well as tailpipe emissions from other vehicles traveling in close proximity to the host vehicle 140. Such noise will not be generated when the same host vehicle 140 is parked/off, which facilitates detection of ambient noise levels that are representative of true ambient noise.

An overarching goal of the automated solutions described in detail herein is a reduction in individualized risk of exposure to air pollution, noise pollution, or both. This goal may be achieved by providing users of the individual host vehicles 140, as well as users of other suitably equipped receiving devices such as smart phones, portable or stationary computers, wearables, etc., with detailed time-specific and location-specific pollution and noise level data in the form of the pollution reports 13. The pollution reports 13 as contemplated herein are generated offline by the RPS 12 using crowd-sourced environmental data, with cloud-based computing functions and remote connectivity to the host vehicles 140 represented in FIG. 1 by the cloud 11. The host vehicles 140 thus effectively function herein as distributed sensor platforms for cooperation with the RPS 12 when performing the present methodology, an embodiment of which is described below with reference to FIG. 4.

The present teachings leverage the wide ranging availability of the vehicle network 10 of FIG. 1, specifically by equipping and operating the individual host vehicles 140 to function as environmental sensor platforms. While the host vehicles 140 are not necessarily limited to the various motor vehicles shown in FIGS. 1 and 2, the nearly ubiquitous use of motor vehicles on roadways of the modern world helps ensure widespread data collection, and thus a higher confidence level in the relevance and accuracy of the collected data. This in turn facilitates dissemination of forward-looking location and time-specific data. Armed with such information, such users may choose to avoid travel to or prolonged presence in regions falling outside of the user's own personal tolerance for exposure to air pollution and/or noise. Additional automated solution options as described below including prompting an operator of the host vehicle 140 with an alternative travel route, a suggested alternative venue or lodging location, or other possible recommendations to enable a given user to avoid or reduce such exposure.

Figure 2:
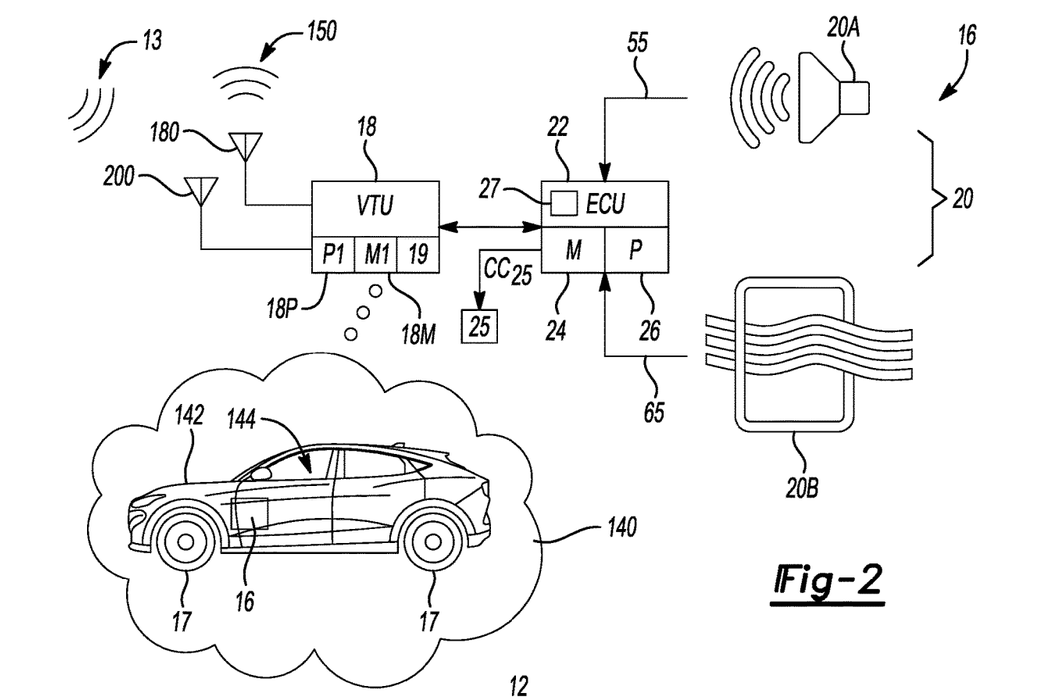
FIG. 2 is a schematic circuit diagram for an environmental system for use aboard the various host vehicles shown in FIG. 1.

Referring to FIG. 2, a representative host vehicle 140 is configured for use as part of the vehicle network 10 of FIG. 1. The host vehicle 140 in the illustrated embodiment is a motor vehicle equipped with road wheels 17, a vehicle body 142 connected to the road wheels 17, and a vehicle interior 144, i.e., a passenger compartment or cabin, which is defined by the vehicle body 142. The host vehicle 140 may be variously embodied as a crossover vehicle as shown, or as a sport utility vehicle, sedan, coupe, truck, farm equipment, or other mobile platform within the scope of the disclosure. Once again as noted above, other types of vehicles may be used in the scope of the present disclosure, including boats or other watercraft, aircraft, rail vehicles, motorcycles, electric bicycles, etc., and therefore the representative crossover vehicle of FIG. 2 is illustrative of the present teachings and non-limiting thereof. Likewise, the collection capabilities of the vehicle network 10 may be augmented by data collected from similarly equipped stationary platforms, such as by residential, commercial, academic, or government buildings, bridges, cell towers, etc.

The host vehicle 140 exemplified in FIG. 2 includes an environmental data system 16, which in turn is in wireless/remote communication with the RPS 12 of FIG. 1. In an exemplary embodiment, the environmental data system 16 includes a vehicle telematics unit (VTU) 18, an electronic control unit (ECU) 22, and a sensor suite 20. The ECU 22 is in wired and/or wireless communication with the VTU 18 and the sensor suite 20, e.g., via a controller area network (CAN) bus, Wi-Fi, or BLUETOOTH® connection as appreciated in the art. The VTU 18 as contemplated herein is an onboard telematic control unit operable for connecting to external devices via the cloud 11 of FIG. 1 using relevant Vehicle-to-Everything (V2X) standards and protocols. In this manner, the VTU 18 is able to communicate wirelessly with the RPS 12, which for its part may act in a capacity as a subscription host service such as ONSTAR®, and possibly with other host vehicles 140 or other external devices, e.g., via cell towers, base stations, mobile switching centers, satellite services, etc. Long-range vehicle communication capabilities with remote, off-board devices such as the RPS 12 may be provided via one or more of a cellular chipset/component, a navigation and location chipset/component, and/or a wireless modem, which are collectively well understood in the art.

The VTU 18 of FIG. 2 as part of its ordinary programmed functionality is able to collect vehicle telemetry data in real-time, including but not limited to speed, position, temperature, and a wide range of onboard systems diagnostic information using available in-vehicle wireless communication technologies, principally BLUETOOTH®, Wi-Fi, NFC, etc. As part of its relevant hardware configuration, the VTU 18 includes or is connected to a Global Positioning System (GPS) receiver 180 and a cellular antenna 200. Telemetry data may be collected via an onboard satellite navigation unit, e.g., a Global Navigation Satellite System (GNSS) module 19, which in turn is connected to the GPS receiver 180, and thus to an orbiting constellation of GPS satellites (not shown).

The sensor suite 20 as contemplated herein includes at least one acoustic sensor 20A and at least one air quality sensor 20B. The respective acoustic and air quality sensors 20A and 20B are configured for measuring corresponding data of the pollution data sample 150 shown in FIG. 1. That is, each acoustic sensor 20A is operable for measuring an ambient noise level, e.g., using one or more unidirectional or arrayed/directional microphones arranged within the vehicle interior 144 of FIG. 1, and for outputting a corresponding measured ambient noise level signal (arrow 55), e.g., in decibels. As the host vehicle 140 may be stationary when the acoustic sensor 20A is activated, as set forth herein, the positioning of at least some of the acoustic sensors 20A within the vehicle interior 144 eliminates inadvertent detection of engine noise, traction motor rotation, or other drivetrain or road noise that could otherwise be confused with ambient noise. However, one or more acoustic sensors 20A may be positioned outside of the vehicle interior 144 in some embodiments, and possibly operated alone or in conjunction with in-vehicle microphones. Automated approaches could be used to minimize detection of in-cabin noise, such as from a radio or passenger conversations, including possibly detecting whether passengers or pets are present within the vehicle interior 144, an open/closed state of windows of the host vehicle 140, etc. Data collection could be triggered locally by the ECU 22, e.g., based on a predetermined sampling interval, or the sensor suite 20 could be activated in response to a request by the RPS 12. For instance, the RPS 12 may selectively request activation of the sensor suite 20 for one or more of the host vehicles 140 based on predetermined collection criteria, such as a relative lack of data for a given region or area of interest.

The air quality sensor(s) 20B measure and quantify ambient air quality/pollution levels, and output a corresponding measured air quality signal (arrow 65) indicative thereof. The air quality sensor 20B may be connected to the vehicle body 142 of FIG. 1 on an exterior thereof, so as to be properly positioned to measure air quality outside of the vehicle interior 144. The air quality sensor 20B may be variously embodied as, e.g., a commercially available particulate matter (PM) sensor, a laser or optical particle counter, or a nephelometer operable for detecting particulate matter based on light scattering. Additionally, the air quality sensor 20B may include one or more gas sensors configured, e.g., via infrared light absorption or other operating principles, to detect the presence and levels of specific gasses, such as but not necessarily limited to ozone, sulfur dioxide, nitrogen oxides (NOx), or other gasses.

The VTU 18 and the ECU 22 may be embodied as one or more digital computer devices equipped with respective memory (M1) 18M and (M) 24, and one or more corresponding processors (P1) 18P and (P) 26. The ECU 22 is also equipped with a timer or clock 27 operable for time-stamping each collected sample, such that the RPS 12 of FIG. 1 is aware of the time and date of collection of each transmitted pollution data sample 150, along with the location of collection as noted above. Algorithms, software, control logic, protocols, and/or methods disclosed hereinbelow, including the representative method 100 of FIG. 4, may be embodied at least in part as computer-executable software stored in the memory 18M and/or 24, e.g., a tangible non-transitory computer-readable storage medium such as flash memory, solid-state drive (SSD) memory, hard-disk drive (HDD) memory, CD-ROM, digital versatile disk (DVD), or other suitable memory devices. Each host vehicle 140 may be equipped with an embedded voice-processing unit utilizing audio filtering, editing, and analysis modules.

Operation of the processors 18P and 26 may entail the use of an application specific integrated circuit (ASIC), a programmable logic device (PLD), a field programmable logic device (FPLD), discrete logic, etc. Thus, instructions embodying the method 100 of FIG. 4 as described below, or alternative embodiments thereof, may be recorded on non-transitory, computer-readable storage medium, with such a medium or media represented for simplicity in FIG. 1 as memory 24. Such instructions, when executed by the processor 26, cause the ECU 22 to perform the environmental sensing and communication functions described herein, with the processor 18P likewise performing functions requested of the VTU 18.

During operation of the ECU 22, the ECU 22 is configured to selectively transmit the collected pollution data samples 150 to the RPS 12 via cooperation with and operation of the VTU 18. Such an action occurs in response to a predetermined set of conditions. Although other conditions may be envisioned within the scope of the disclosure, the predetermined set of conditions according to an exemplary embodiment include the host vehicle 140 being parked or otherwise stationary in an ignition-off state for a calibrated amount of time, e.g., at least about five seconds. The predetermined set of conditions may also or alternatively include other conditions, such as the host vehicle 140 being unoccupied, and/or the method 100 may be enabled by the owner/operator or other user of the host vehicle 140 in an "opt-in" use scenario.

The ECU 22 of FIG. 2 is configured to receive the pollution report 13 from the RPS 12 of FIG. 1, and to ultimately execute a control action in response to the pollution report. For instance, the ECU 22 may execute an onboard control action, i.e., a control action aboard the host vehicle 140, by controlling a display screen 25 in response to the pollution report 13 using display control signals (arrow $CC_{25}$). Likewise, the ECU 22 may calculate and display alternative travel route options, suggest alternative destinations, etc., based on the content of the pollution report 13 as described below. The pollution report 13 possibly includes digital noise and pollution maps or other descriptive information descriptive of the ambient noise level and an air pollution level at a current location or a destination of the host vehicle 140.

The RPS 12 for its part ultimately combines the pollution data samples 150 with pollution data samples 150 provided by other participating host vehicles 140, models the ambient noise and air pollution levels at a current location or a destination of the host vehicle 140, and outputs the pollution report 13 in a customized/region-specific manner to the various host vehicles 140 and/or other users or subscribers of the RPS 12 based on the present or expected locations thereof. Other control actions may be performed external to the host vehicle 140, and thus as offboard control actions, e.g., by displaying similar information on portable electronic devices, wearables, etc., and thus the present teachings do not necessarily culminate in onboard control actions.

As the host vehicle 140 of FIG. 2 as a predetermined condition may be stationary/turned off when the acoustic sensor 20A is activated, the acoustic sensor 20A is strategically positioned within the vehicle interior 144, e.g., as an in-cabin microphone array. This placement helps eliminate detection of engine, traction motor, wind, road, or other drivetrain sounds that could otherwise be confused with the ambient noise of concern herein. Moreover, as modern vehicles tend to be equipped with such in-cabin microphones, implementation of the present teachings may include repurposing existing microphones to function in the disclosed manner. Automated approaches could also be used to minimize detection of in-cabin noise from a radio or passenger conversations. For instance, one possible solution includes detecting occupant presence using seat-based weight sensors, infrared sensors, motion sensors, door lock/seatbelt latch sensors, and the like, and then activating the acoustic sensors 20A when the vehicle interior 144 is verified in some manner as being unoccupied.

Figure 3:
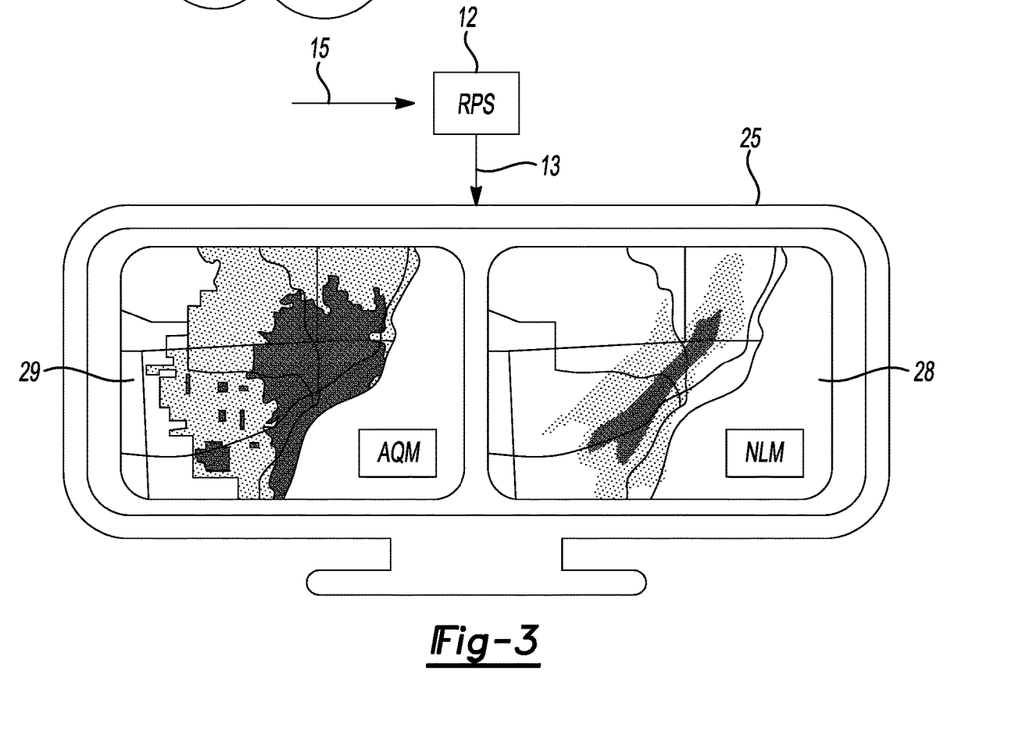
FIG. 3 illustrates representative air quality and noise level maps generated by a remote processor and displayed via a display screen as part of the present strategy.

Referring to FIG. 3, the remote processing station (RPS) 12 in the course of its ongoing operation receives the global set of pollution data 15, which as noted above includes the various pollution data samples 150 each transmitted by the individual host vehicles 140 of FIG. 1 over a period of time. The RPS 12 may be configured to generate two intuitive graphical maps as part of the pollution report 13: (1) an air quality map (AQM) 29, and (2) a noise level map (NLM) 28. When the pollution report 13 is ultimately received by a receiving device such as the host vehicle 140 of FIG. 2 or another suitable device equipped with the above-noted display screen 25, the AQM 29 and/or the NLM 28 are displayed via the display screen 25, for example as a color-coded overlay to a displayed road map, or a plain text message announcing the pollution level and/or noise level. As part of this capability, the RPS 12 is programmed to store a history of the pollution reports 13 for a given region of operation on a computer-readable storage medium, as historic data, and to generate a model of noise and pollution for the given region using the historic data. Thus, the pollution report 13 may include the historic data, either in whole or in part, as set forth below.

In an in-vehicle use scenario, the receiving device includes the VTU 18 and the ECU 22 of the host vehicle 140 shown in FIG. 2, in which case the display screen 25 may be embodied as a touchscreen of a center console, e.g., a navigation or infotainment system. Such an implementation may facilitate route planning options, for instance by informing an operator of the host vehicle 140 of high noise and/or air pollution levels in or around one or more locations along a planned travel route, or a destination thereof. Alternatively, the receiving device may be a smartphone, in which case the display screen 25 may be implemented as a touchscreen of the smartphone used onboard/aboard or apart from/external to the host vehicle 140. Other fixed or portable electronic devices may be envisioned as possible receiving devices within the scope of the disclosure, such as desktop computers, laptop computers, tablet computers, or smartwatches or other wearable devices, and therefore the configuration of the display screen 25 may vary.

Figure 4:
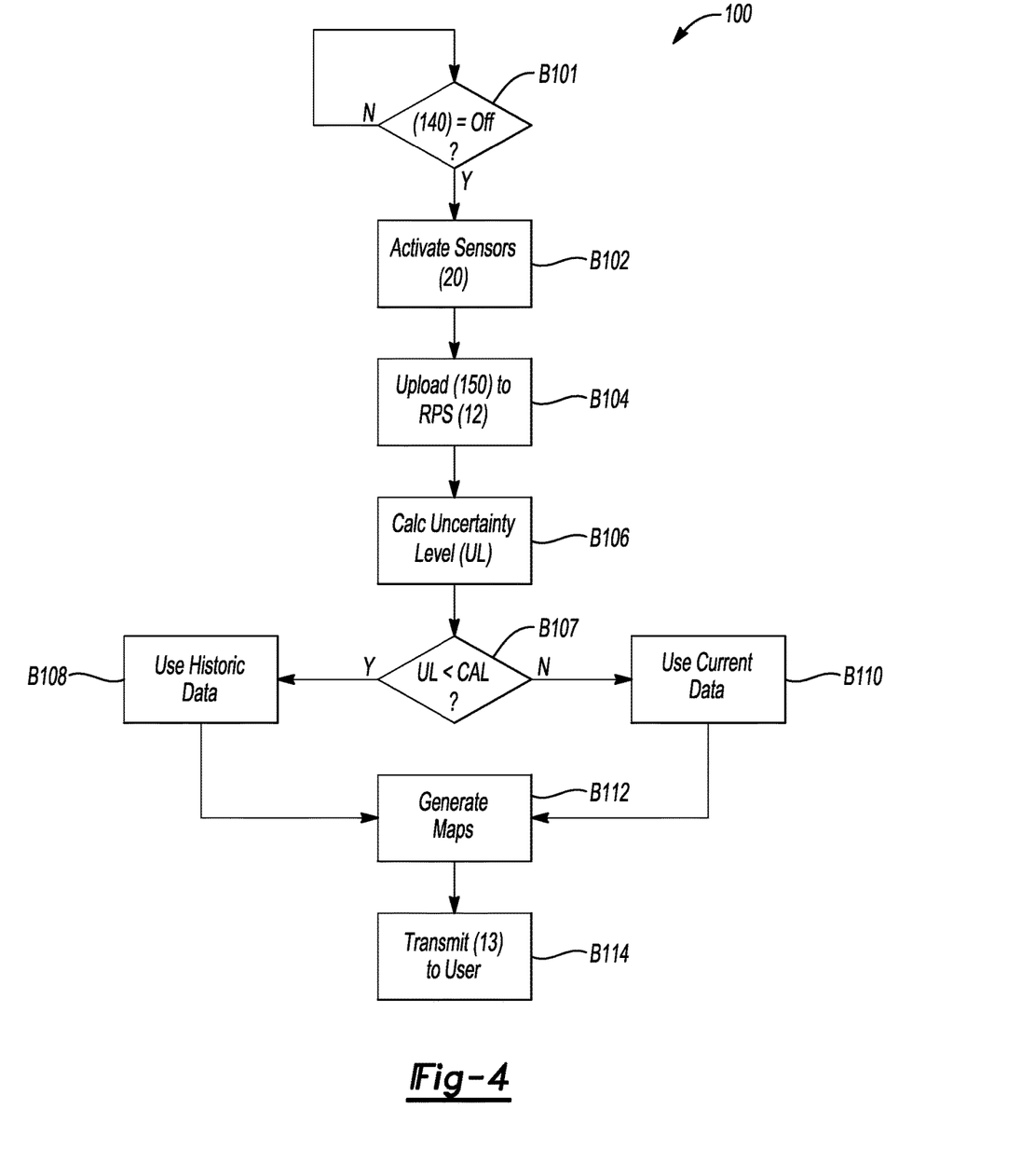
FIG. 4 is a flow chart describing an exemplary embodiment of the present method.

Referring now to FIG. 4, an exemplary embodiment of the present method 100 commences with block B101 ("(140) =OFF?"), with the term "block" as used herein referring to programmed logical steps as performed by one or more hardware components of the vehicle network 10 shown in FIG. 1. Block B101 for a given host vehicle 140 within the vehicle network 10 may entail detecting a set of predetermined conditions, with the conditions possibly being a single predetermined condition or multiple predetermined conditions in different embodiments. As noted above, a suitable predetermined condition for executing the method 100 may be a parked, stationary, or "off" or quiet state of the host vehicle 140, with other conditions possibly including the absence of passengers or pets in the vehicle interior, a user's "opt-in" status being active, etc. The method 100 proceeds to block B102 when such predetermined conditions have been satisfied.

Block B102 ("Activate Sensors (20)") includes activating the sensor suite 20 of FIG. 2. While embodiments contemplate use of the acoustic sensor(s) 20A and the air quality sensor(s) 20B, those skilled in the art will appreciate that the method 100 may use either or both types of sensors 20A and/or 20B, either at various times or exclusively for the given host vehicle 140. That is, based on user preference or instructions from the remote processing station (RPS) 12 of FIG. 1, the respective acoustic and/or air quality sensors 20A and/or 20B may be activated at the same time or at separate times, e.g., based on availability of sufficient data or a lack thereof for a given region. The method 100 proceeds to block B104 once the sensor suite 20 has been activated.

Block B104 ("Upload (150) to RPS (12)") includes sampling the relevant information, in this case ambient air quality and noise levels, for a calibrated sampling interval, and thereafter uploading the pollution data sample(s) 150 to the cloud 11 of FIG. 1, for ultimate communication to the RPS 12. In order to limit power drain on a battery or other power supply operable for energizing the sensor suite 20, the ECU 22 may be configured to limit activation of the sensor suite 20 to less than, e.g., five minutes per hour. That is, the sampling interval should be kept at a minimum, e.g., 30 seconds to one minute per hour, or three to five minutes per hour in different implementations. Once the pollution data sample 150 has been collected and time-stamped via the clock 27 of FIG. 2, the VTU 18 wirelessly communicates the pollution data sample 150 to the RPS 12 using the cellular antenna 200 of FIG. 2. The method 100 then proceeds to block B106.

At block B106 ("Calc. Uncertainty Level (UL)"), which is performed by the RPS 12 of FIG. 1, the RPS 12 may calculate, for a given region, a numeric uncertainty level or confidence level, e.g., based on a number of collected samples or a number of host vehicles 140 collecting measurements for a particular region of interest. As an illustrative example, a collection density of, e.g., 500 samples per day covering several consecutive weeks in a few square blocks of territory, might correspond to a high confidence level, while 50 samples collected per day for the same territory over non-consecutive days, perhaps with large data gaps during weekends, might correspond to a low confidence level. Thus, a threshold collection density may be used by the RPS 12 to help classify the global set of pollution data 15 and/or the constituent pollution data samples 150 into low, medium, and high levels of confidence for a given region. The RPS 12 may perform the same uncertainty analysis for both noise and pollution levels.

As part of the envisioned approach, current and historic data may be selectively blended or combined according to the level of uncertainty. When uncertainty of current data is high, for example, the RPS 12 of FIG. 1 may rely more heavily or even exclusively on historic data for the region of interest. In the alternative, the RPS 12 may elect to blend current data with historic data, e.g., using data weighting or a predetermined formula-based approach, to fill in gaps in the data samples 150, i.e., with more reliance on the historic data when confidence levels are low, and with more reliance on current data when confidence levels are high. Data weighting is thus performed based on confidence level, either in a fixed manner or on a sliding or variable scale, in accordance with this optional implementation of the present teachings. The method 100 proceeds to block B107 when the confidence level of the data samples 150 has been determined for a given region of interest.

At block B107 ("UL<CAL?"), the RPS 12 next compares the calculated uncertainty level to a calibrated threshold, and proceeds to block B108 when the uncertainty level is less than the threshold. In the alternative, block B107 proceeds to block B110 when the uncertainty level is greater than the threshold.

Block B108 ("Use Historic Data") may entail retrieving the historic data, i.e., previously determined noise and pollution levels for a given region of interest, in whole or in part. Such historic data is recorded over time with ongoing operation of the RPS 12. That is, the RPS 12 maintains a running history of noise and pollution levels for multiple regions of interest on a digital map, i.e., a geospatial mapping database. When up-to-date data is not available, or the available data is uncertain due to the low number of reporting sensors, the RPS 12 may pull the historic data from its resident memory and feed the historic data into block B112, to which the method 100 proceeds. While use of historic data is not ideal, being collected at potentially different times of day, week, or year relative to the times of day, week, or year of interest to a user, the historic data is preferable to reporting low confidence data, or not reporting noise or pollution data.

Block B110 ("Use Current Data") may entail using current data noise and pollution levels for the given region of interest, predominantly or exclusively in lieu of historic data. The RPS 12 thus relays the current data to block B112, with the method 100 thereafter proceeding to block B112.

At block B112 ("Generate Maps"), the RPS 12 of FIG. 1 generates the AQM 29 and NLM 28 as represented in FIG. 3. Block B112 may include using processing spatially distinct data samples 150 from the various host vehicles 140 via the RPS 12, and then building or updating a model from the data samples 150, including the reported position, time of day, day of week, etc. Data modeling or model fitting may be used to generate the AQM 29 and NLM 28. The generated maps may be used to update the aforementioned historic data, which in turn may be optionally sold or provided to third parties of interest, e.g., on an application ("app")-based subscription basis or as an added service. The method 100 then proceeds to block B114.

Block B114 ("Transmit (13) to User") entails transmitting the pollution report 13 via the RPS 12 to the receiving device, which in a non-limiting embodiment includes one of the various host vehicles 140 of FIG. 1 as noted above. In a possible implementation, the pollution report 13 includes the AQM 29 or NLM 28, or both, or the pollution report 13 may communicate the relevant information in another way, e.g., as an SMS text message. Once received by the VTU 18 of FIG. 1, or comparable receiving hardware of an alternatively constructed receiving device, the AQM 29 and NLM 28 may be displayed via the display screen 25 of FIG. 3.

As part of block B114 or another logical block, a user of the host vehicle 140 may enter a route destination into available route planning software, which in turn may be operated on or through cooperation with the ECU 22, possibly in conjunction with the user's smartphone and applications accessible thereon. The ECU 22 may overlay the AQM 29 and NLM 28 onto a route map displayed via the display screen 25. In this manner, the user is able to view intuitive representations of the noise and pollution levels on or along the displayed travel route, e.g., as color coded shading, perhaps using the typical green, orange/yellow, red scale for progressively increasing noise or pollution levels.

Optionally, the route planning system may suggest alternative travel route options that would bypass the more polluted or noisy locations along the route. A similar approach may also be used outside of the context of route planning. For example, one planning an outdoor event or a hotel reservation could access a software application ("app") on their smartphone to view the AQM 29 and/or the NLM 28 for a given location. The user could possibly enter desired thresholds for pollution or noise, with the noted app thereafter displaying alternative venues or hotel locations meeting the user's specific noise/pollution requirements.

As will be appreciated by those skilled in the relevant art, some aspects of the present disclosure may be implemented at the level of the RPS 12 of FIG. 1. For instance, the RPS 12 may include a computer-readable storage medium, e.g., the processor(s) 12P, on which is recorded instructions executable by a processor 12P from resident memory 12M. Execution of such instructions may cause the processor 12P to receive the global set of pollution data 15 from the plurality of host vehicles 14, each respective host vehicle 140 having a corresponding sensor suite 20 operable for collecting the pollution data sample 150 at a current location of the respective host vehicle 140. Instruction execution also causes the processor 12P to calculate the above-described uncertainty level in the global set of pollution data 15 for the current location, as well as to generate, via the processor 12P using the global set of pollution data 15, at least one color-coded map exemplified at 28 and 29 of FIG. 3. Such maps 28 and 29 of the ambient noise level and an ambient air quality level, respectively, are based in part on the uncertainty level. Execution of the instructions ultimately results in the pollution report 13 being transmitted to a receiving device, e.g., the host vehicle(s) 140 or another user device, with the pollution report 13 being inclusive of the at least one color-coded map.

The processor 12P in this instance may have access to a history of the pollution reports for a given region of operation, with such a history described above as historic data. The instructions are thus executable by the processor 12P to cause the processor 12P to generate a model of the ambient noise level and an ambient air quality level for a region inclusive of the current location and/or destination using the historic data, and to generate the pollution report 13 using the historic data. Among other possible actions, instruction execution may also cause the processor 12P to selectively request activation of the sensor suite 20 for one or more of the host vehicles 140 based on predetermined collection criteria, including but not limited to a gap or lack of sufficient data coverage for a particular region of interest.

The foregoing teachings therefore enable the host vehicles 140 represented in FIG. 1 to be used as sensor platforms for detecting air pollution and noise levels, and to thereby improve upon the current state of the art with respect to in-vehicle data collection, dissemination, and possible end use. Pollution data samples 150 provided by a large number of such host vehicles 140, spread across a wide range of territory, which in the modern world is essentially global. Time- and location-dependent models of air quality and noise levels may be generated based on current and historic measurements at a given location or destination. The outputs of such maps may be intuitively displayed to a consumer of the pollution reports 13, e.g., as color-coded digital maps, road map overlays, or simple SMS text messages or other suitable alerts. The present teachings likewise contemplate possible data fusion with other air quality-monitoring systems or networks to obtain higher spatial resolution. The disclosure is therefore not necessarily limited solely to the vehicular use context detailed herein.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. A host vehicle for use with a remote processing station (RPS) configured to generate a pollution report from a global set of pollution data, the host vehicle comprising:
    a vehicle body;
    a vehicle telematics unit (VTU) in wireless communication with the RPS, and connected to the vehicle body;
    a sensor suite, including an acoustic sensor and/or an air quality sensor respectively configured for collecting a pollution data sample at a current location of the host vehicle, the pollution data sample including an ambient noise level and/or an ambient air quality level, wherein the global set of pollution data includes the pollution data sample and additional pollution data samples from one or more additional host vehicles;
    an electronic control unit (ECU) in communication with the VTU and the sensor suite, wherein the ECU is configured to selectively transmit the pollution data sample to the RPS in response to a predetermined set of conditions, via operation of the VTU;
    wherein the predetermined set of conditions include the pollution data sample being taken when the host vehicle is unoccupied;
    wherein the predetermined set of conditions includes a lack of data, in accordance with predetermined collection criteria, from a region in which the host vehicle is currently located; and
    wherein the RPS is programmed to store a history of pollution reports for a given region of operation on a computer-readable storage medium, as historic data, and to generate a model of noise pollution and air pollution for the given region of operation using the historic data and not using current data when a calculated uncertainty level regarding the current data is greater than a predetermined threshold uncertainty level, wherein the sensor suite includes the acoustic sensor and the air quality sensor, and the ECU is configured to receive the pollution report from the RPS, including receiving the historic data.

2. The host vehicle of claim 1, wherein the pollution report is descriptive of a noise level and an air pollution level at the current location or a destination of the host vehicle.

3. The host vehicle of claim 1, further comprising road wheels connected to the vehicle body, wherein the host vehicle is a motor vehicle and the predetermined set of conditions includes the motor vehicle being parked, stationary, or in an off state.

4. The host vehicle of claim 1, further comprising a display screen, wherein the pollution report includes mapping data indicative of the ambient noise level and the ambient air quality level, and wherein the ECU is configured for transmitting the pollution report to the display screen for presentation of the mapping data thereon.

5. The host vehicle of claim 1, wherein the vehicle body defines a vehicle interior, and wherein the acoustic sensor includes at least one microphone positioned within the vehicle interior.

6. The host vehicle of claim 1, wherein the air quality sensor includes a particle counter.

7. The host vehicle of claim 1, wherein the air quality sensor includes a gas sensor.

8. The host vehicle of claim 1, wherein the ECU is configured to limit activation of the sensor suite to less than five minutes per hour.

9. The host vehicle of claim 1, wherein the ECU is configured to prompt an operator of the host vehicle with an alternative travel route option based on the pollution report.

10. A method for use with a host vehicle in communication with a remote processing station (RPS), the RPS being configured to generate a pollution report from a global set of pollution data, the method comprising:
    in response to a predetermined set of conditions, using a sensor suite of the host vehicle to collect a pollution data sample at a current location of the host vehicle, via an electronic control unit (ECU) of the host vehicle, wherein the sensor suite includes an acoustic sensor and/or an air quality sensor respectively configured to measure an ambient noise level and an ambient air quality level;
    transmitting the pollution data sample to the RPS via a vehicle telematics unit (VTU) of the host vehicle, the VTU being in communication with the ECU, wherein the pollution data sample is a constituent part of the global set of pollution data;
    receiving the pollution report from the RPS, the pollution report being based on prior data samples from a plurality of host vehicles;
    in response to the pollution report, displaying the ambient noise level and/or the ambient air quality level on a display screen;
    wherein the predetermined set of conditions includes a lack of data, in accordance with predetermined collection criteria, from a region in which the host vehicle is currently located; and
    wherein the RPS is programmed to store a history of pollution reports for a given region of operation on a computer-readable storage medium, as historic data, and to generate a model of noise pollution and air pollution for the given region using the historic data and not using current data when a calculated uncertainty level regarding the current data is greater than a predetermined threshold uncertainty level, wherein said receiving the pollution report from the RPS includes receiving the historic data.

11. The method of claim 10, wherein the predetermined set of conditions includes the host vehicle being parked, stationary, or in an off state.

12. The method of claim 10, wherein the host vehicle includes a vehicle body defining a vehicle interior, and wherein using the sensor suite of the host vehicle includes using, as the acoustic sensor, at least one microphone positioned within the vehicle interior.

13. The method of claim 10, wherein using the sensor suite of the host vehicle for collecting the pollution data sample includes using a particle counter as the air quality sensor.

14. The method of claim 10, wherein using the sensor suite of the host vehicle for collecting the pollution data sample includes using a gas sensor as the air quality sensor.

15. The method of claim 10, further comprising limiting activation of the sensor suite to less than five minutes per hour via the ECU.

16. The method of claim 10, further comprising prompting an operator of the host vehicle via the ECU with an alternative travel route option based on the pollution report.

17. A nontransitory computer-readable storage medium on which is recorded instructions, the instructions being executable by a processor of a remote processing station (RPS) to cause the processor to:
receive a global set of pollution data from a plurality of respective host vehicles in communication with the RPS, each respective host vehicle having a corresponding sensor suite operable for collecting a pollution data sample at a current location of said each respective host vehicle in response to a predetermined set of operating conditions, via an electronic control unit (ECU) of said each host vehicle, wherein the corresponding sensor suite includes an acoustic sensor and/or an air quality sensor respectively configured to measure an ambient noise level and an ambient air quality level, and wherein the pollution data sample is a constituent part of the global set of pollution data;
calculate an uncertainty level in the global set of pollution data for the current location via the processor, wherein the uncertainty level is based on a number of collected samples for a particular region of operation or on a number of the plurality of respective host vehicles collecting measurements for the particular region of operation;
generate, via the processor of the RPS using the global set of pollution data, at least one color-coded map that is indicative of the ambient noise level and the ambient air quality level at the current location and/or a destination of said each respective host vehicle, the at least one color-coded map being based in part on the uncertainty level; and
transmit a pollution report to a receiving device for display thereon, the pollution report including the at least one color-coded map;
wherein the predetermined set of operating conditions includes a lack of data, in accordance with predetermined collection criteria, from a region in which said each respective host vehicle is currently located; and
wherein the RPS is programmed to store a history of pollution reports for the particular region of operation on a computer-readable storage medium, as historic data, and to generate a model of noise pollution and air pollution for the particular region using the historic data and not using current data when the calculated uncertainty level regarding the current data is greater than a predetermined threshold uncertainty level, wherein transmitting the pollution report includes transmitting the historic data.

18. The nontransitory computer-readable storage medium of claim 17, wherein the processor has access to the history of pollution reports for the particular region of operation as the historic data, the instructions being executable by the processor to cause the processor to generate a model of the ambient noise level and the ambient air quality level for a first region inclusive of the current location and/or the destination, using the historic data, and to generate the pollution report using the historic data.

19. The nontransitory computer-readable storage medium of claim 17, the instructions being executable by the processor to cause the processor to selectively request activation of the sensor suite for one or more of the host vehicles based on the predetermined collection criteria including insufficient data coverage for the particular region of operation.

20. The nontransitory computer-readable storage medium of claim 19, wherein the ECU is configured to limit the activation of the sensor suite to less than five minutes per hour.

* * * * *